Nov. 29, 1932.  E. D. TILLYER  1,889,456
DIAGNOSTIC INSTRUMENT
Filed Jan. 5, 1928   3 Sheets-Sheet 2
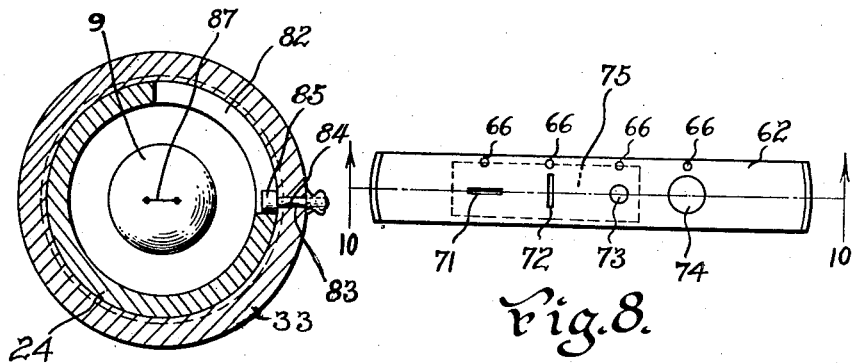
Fig. 7.   Fig. 8.
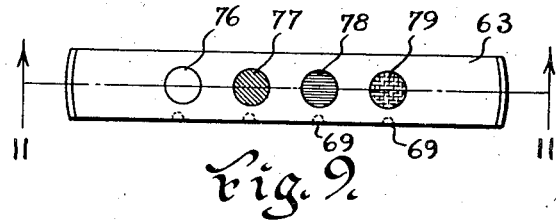
Fig. 9.
Fig. 10.
Fig. 11.
Inventor
Edgar D. Tillyer.
By Harry H. Styll
Attorney Inventor
Edgar D. Tillyer.
By Harry H. Styll.
Attorney Patented Nov. 29, 1932

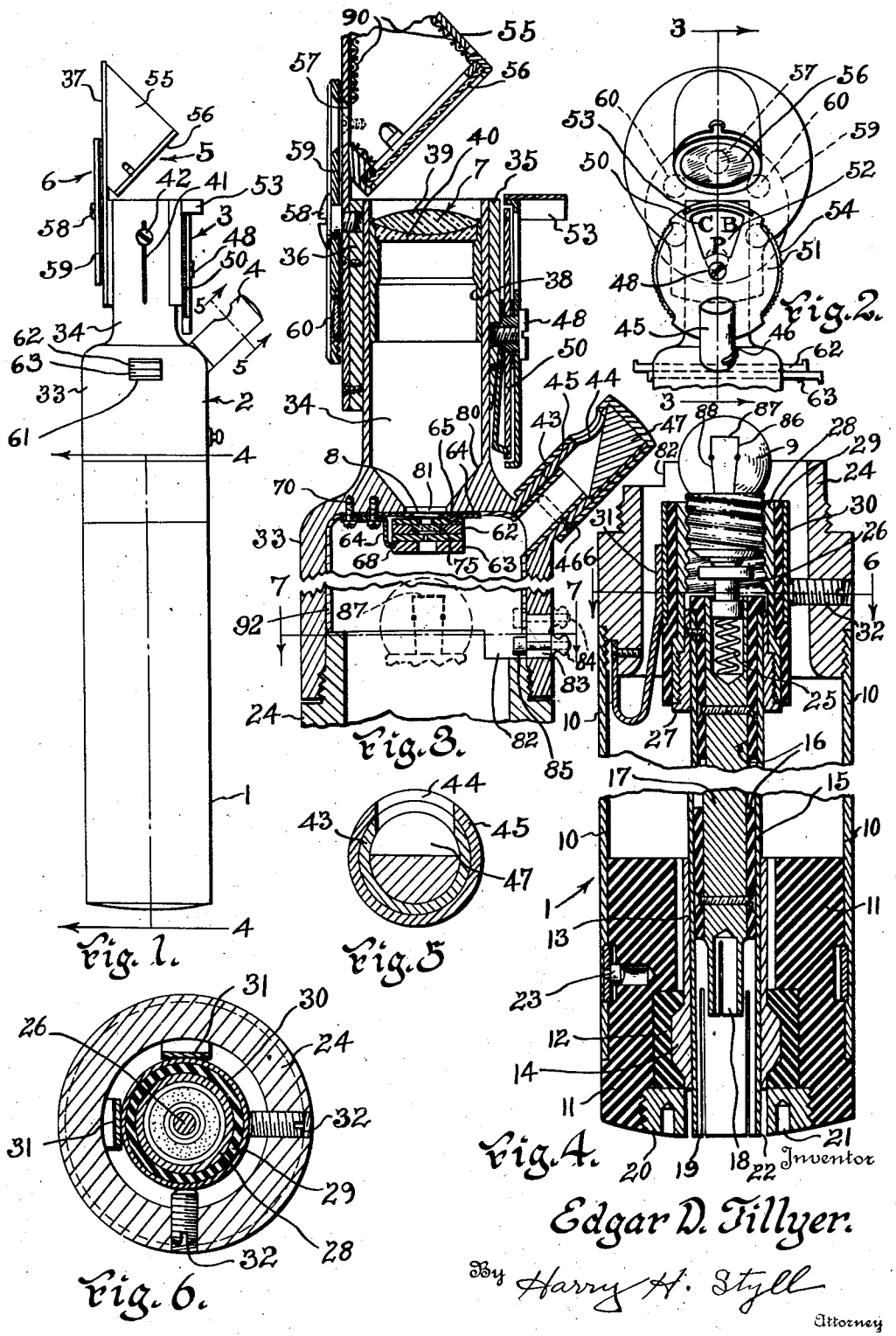

1,889,456

UNITED STATES PATENT OFFICE

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

DIAGNOSTIC INSTRUMENT

Application filed January 5, 1928. Serial No. 244,646.

This invention relates to improvements in instruments for examining the human eye and has particular reference to that type of eye-examining instrument usually known as a retinoscope.

The principal object of this invention is to obtain ophthalmic corrections of the eye independent of the will of the patient.

Another object of the invention is to provide improved means for examining the eye at rest and also for examining the eye when the eye is in use.

Another object of the invention is to provide in a retinoscope means for correcting the optical defects in the operator's eye.

Another object of the invention is to provide minimum illumination to the patient and maximum illumination to the operator.

Another object of the invention is to provide improved means whereby an aberration-free curve mirror effect may be obtained.

Another object of the invention is to provide means for changing from direct filament illumination of high intensity of diffused illumination of low intensity.

Another object of the invention is to provide a fixation object to hold the patient's attention and to provide means for illuminating the object and for shutting off the illumination therefrom when the fixation object is not in use.

Another object of the invention is to provide improved means for throwing a streak or ribbon-like beam of light into the patient's eye.

Another object of the invention is to provide improved means for throwing a streak or ribbon-like illumination into the patient's eye in selected meridians at right angles to each other.

Another object of the invention is to provide improved means for diffused and undiffused illumination of the patient's eye.

Another object of the invention is to provide means for throwing colored rays of light into the patient's eye.

Another object of the invention is to provide means for focusing the light at the desired distance in front of or behind the front focal plane of the patient's eye.

Another object of the invention is to provide improved means for turning or rotating the illuminating means to a desired angle.

Another object of the invention is to provide improved means for aligning the illuminating means with respect to the limiting angles of the instrument.

Another object of the invention is to provide improved means for aligning the lamp filament along the axis of rotation of the instrument.

Another object of the invention is to provide complete insulation of the instrument from the lamp circuit to prevent the patient and the operator from receiving a shock, and to prevent short-circuiting and blowing out the lamps when a plurality of instruments are used on the same circuit.

Another object of the invention is to provide an aberration-free beam of light by the use of a highly corrected telescopic projector.

Other objects and advantages of the invention will become apparent from the following description taken in connection with the accompanying drawings, and it will be apparent that many modifications and changes may be made in the details of construction and arrangement of parts without departing from the spirit of the invention as expressed in the accompanying claims. I, therefore, do not wish to be limited to the exact details shown and described, as the preferred forms only have been shown by way of illustration.

The theory of ophthalmic lenses used for correcting the eyes has been developed to a very high extent and the manufacture of the lenses has kept pace with the mathematical developments so that at the present time the actual correction lenses are of utmost accuracy, and beyond that of eye testing systems as embodied in retinoscopes. Early instruments have either given too small an amount of light so that the operator could not see the reflexes in the patient's eye or have blinded the patient and produced muscular spasm by the extreme intensity involved. It has been practically impossible to use the curved mirror effect on any self-luminous instrument because the curved mirror had an acute angle to the line of light introducing such excessive astigmatism in the beam that the actual patient's astigmatism was masked. The illumination of the fixation target on early dynamic instruments was irregular, some parts receiving more illumination than others, and the angular separation between the direction of the test and the fixation target was so great that errors were introduced by measuring a point off from the fundus instead of very close to or at the fundus.

The principal object of my invention is to obviate these difficulties. It is my endeavor to incorporate in one instrument combinations that will provide for all of the retinoscope tests that are needed, including the correction of the error in the operator's eye, so that these tests may readily be made with the one instrument, and avoiding the errors of design present in prior art instruments.

Referring to the drawings:

Fig. 1 is an outside elevation of a retinoscope embodying the invention;

Fig. 2 is a partial view showing the patient's side of the head of the instrument;

Fig. 3 is an enlarged cross section on line 3—3 of Fig. 2;

Fig. 4 is an enlarged section on line 4—4 of Fig. 1;

Fig. 5 is a cross section on line 5—5 of Fig. 1;

Fig. 6 is a cross section on line 6—6 of Fig. 4;

Fig. 7 is a cross section on line 7—7 of Fig. 3;

Fig. 8 is a top of plan view of one of the cross slides in the instrument;

Fig. 9 is a view similar to Fig. 8 showing a second cross slide;

Fig. 10 is a cross section on line 10—10 of Fig. 8;

Fig. 11 is a cross section on line 11—11 of Fig. 9.

Figure 12:
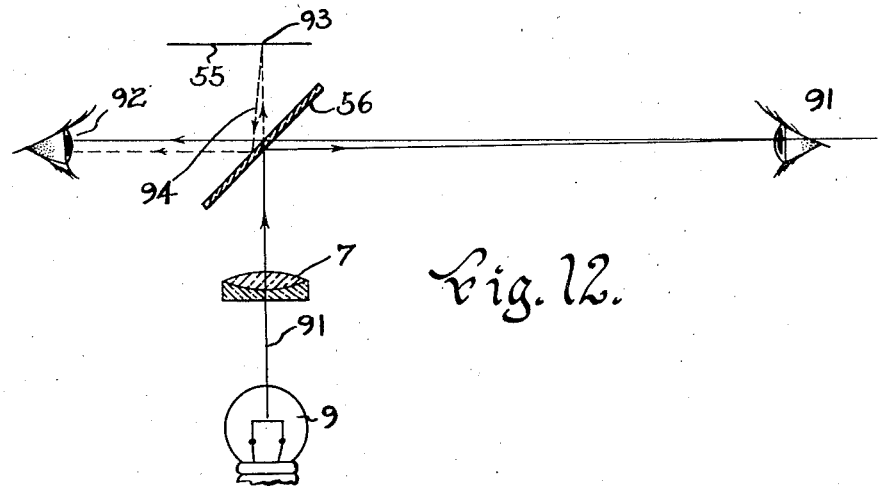
Fig. 12 is a diagrammatic view showing the reflections of a beam of light from the light source to the patient's eye back to the operator's eye.

Referring to the drawings wherein similar characters of reference indicate corresponding parts throughout, the invention consists broadly of a handle 1 and a retinoscope head 2 having a fixation target 3, means 4 for illuminating the fixation target, a reflector 5 and a correction lens disc 6, a projection lens 7, cross slides 8, and an illuminating lamp 9.

The handle 1 comprises a tube 10, preferably a metallic tube. Within the tube 10 at the bottom is placed a rotatable insulating ring 11, preferably made of hard rubber. Within the ring 11 is a second ring 12 preferably made of soft rubber or other resilient material. Within the ring 12 is a tube 13 preferably of metal having an enlargement 14 swelled out into the internal portion of the ring 12. Within the tube 13 is the circuit conducting tube 15 in which is fitted the insulating tube 16 and in which in turn is fitted the conducting rod 17. At the bottom of the conducting rod 17 is a socket connection 18 for one lead of the electric source, whereas the other lead is connected at 19 to the conducting tube 15, thus providing the two leads for an electric socket connection. At the lower end surrounding the conducting tube 15 is the retaining screw cap 20 having the recesses 21 by which it may be backed out or screwed into the insulating ring 11, the said cap 20 being spaced from the conducting tube 15 as indicated at 22. The insulated ring 11 is held in position in the tube 10 by the spring lock ring 23. This ring allows the insulated ring 11 to be rotated but prevents it from being drawn out of the tube 10.

The retinoscope head support member 24 is screw-threaded into the top of the tube 10, this ring being preferably a metal annulus. The internal conducting rod 17 is recessed at the top to receive the spring 25 which engages the contact plug 26 which is adapted to contact with the base contact of the lamp 9. This connection completes one lead to the lamp. The other lead through the conducting tube 15 is connected with the lamp through the metallic threaded ring 27 contacting with the lamp support ring 28 which is screw-threaded on its internal side to receive the screw thread of the lamp base, thus completing the circuit from the base to the lamp. Surrounding the ring 28 is an insulation ring 29 which in turn carries a metallic ring 30. On one side is a bent spring 31 having one end secured to the member 24 and the other end contacting with the ring 30. On the opposite side is the screw plug 32 also engaging the ring 30. By adjusting the screw 32 in or out the lamp bulb 9 may be adjusted with respect to the axial line of the handle. By turning the insulation ring 11 it will be seen that the lamp 9 may be rotated about the axial center line of the handle. The soft rubber washer 12 provides in effect a universal connection between the central lamp support and the handle by which the lamp may be displaced laterally within the handle by means of the adjusting screws 32 and the springs 31. The bulb 9 is screwed into or out of the ring 28 in the usual way. With this construction of handle short circuiting is prevented, thus avoiding shocking the patient or the operator. In instruments plugged into the ordinary house current serious accidents have occurred by both the patient and the operator being shocked with heavy charges of electricity. With this form of insulation of the handle it has been found that these shocks are avoided. This is due primarily to the fact that in prior art instruments one lead of the circuit was carried through the metallic tube 10, the other being carried through the center, making it liable to short circuit if it should come in contact with other instruments lying on the table and with the patient's face, etc. In the present structure it will be noted that both leads of the circuit are carried up in the internal portions of the handle.

The head 2 of the instrument comprises the cap 33 which is screw-threaded into the cap support 24. This cap has an internal chamber for carrying the cross slides 8 and a light conducting tube or passage way 34 adapted to carry the condensing lens 7. On the outside of the light conducting tube 34 on one side is a shoulder 35 adapted to carry the fixation target 3 and on the other side is a second raised shoulder 36 adapted to carry the retinoscope disc 37. Within the tube 34 is a slide ring 38 carrying the condensing lens system 7 which comprises a lens 39 and a lens 40 in combination as shown in Fig. 3. Within the walls of the tube 34 is the slot 41 in which is fitted the pin 42 which has its inner end secured in the member 38. By loosening the pin 42 slightly the condensing lens 7 may be moved up and down in the tube 30 on its holder 38.

Projecting from one side of the cap 32 is the tube 43 having an opening 44. Over this tube is a rotatable cover tube 45 having an opening that may be aligned with the opening 44. There is a slot in the cover tube 45 into which the screw pin 46 fits. This allows the cover 45 to be rotated on the tube 43 but prevents it from being slipped off. In this way the opening 44 of the cover 45 and tube 43 may be aligned or the cover 45 may be moved so as to close the opening 44 in the tube 43. Inside of the tube 43 is a reflector 47 which may be either a mirror or a prism adapted to reflect light along the center line of the tube 43 out through the opening 44.

On the shoulder 35 of the tube 34 and pivoted at 48 is a rotatable disc 50 which forms the fixation object 3. Over the rotatable disc 50 is the cover plate 51 having a cut out space 52 and a hood or shield 53 thereover. The disc 50 may be rotated by its knurled edge 54. The disc 50 is provided with fixation objects such as letters, numbers or other characters which may be rotated into the opening 52 where they are visible to the patient. It will be noted that the opening 44 of the tube 43 is so positioned that when the opening in the cover tube 45 is in line with the opening 44 light from within the chamber 33 will be thrown upon the fixation objects or letters on the disc 50, and that when the opening in the cover tube 45 is thrown out of alignment with the opening in the tube 43 no light will shine upon the fixation objects. Secured to the retinoscope disc 37 is the reflector holder casing 55 in which is secured the reflector 56 which is preferably of plain transparent glass without mirror backing. The reflector 56 is positioned in axial alignment with the light tube 34 so that a ray of light from the lamp coming up through the tube 34 will strike the deflector and be reflected into the patient's eye.

The reflector holder casing 55 is lined with a light abrading material 90. This lining prevents the reflection of light in a direction that would interfere with the ray of light passing from the patient's eye to the operator's eye. In Fig. 12 a light ray 91 passes from the light source 9 through the lens 7 to the reflector 56. A portion of the light passes to the patient's eye 91 and back through the reflector to the operator's eye 92. A portion, however, passes directly through the reflector 56 and impinges on the reflector casing 55 as indicated at 93. If the reflector casing 55 is provided with a light absorbing lining 90 there will be no reflections of this light, but if it is not then the light will be reflected back as shown at 94 and will interfere with the light coming to the operator's eye from the patient's eye.

Centrally of the disc 37 is a sight opening 57 through which the operator looks into the patient's eye. Pivoted at 58 is the lens disc 59 carrying a plurality of lenses 60 marginally located and adapted to align with the opening 57. One of the lens positions 60 is left blank so that when the opening is aligned with the opening 57 there is a clear opening through both the discs 37 and 59. The lenses 60 are corrective lenses adapted to correct the defects of the operator's eye so that when he looks through the opening 57 into the patient's eye he will do so with corrected vision. The marginal edge of the disc 59 is knurled so that the disc may be rotated thereby to position the desired lens 60 in line with the opening 57.

On the opposite sides of the cap 33 are the openings 61 adapted to receive the slide members 62 and 63. A spring blade member 64 having a projection 65 adapted to fit into the indents 66 of the slide 62, and a spring member 67 having the projections 68 adapted to fit into the indents 69 in the slide members 63 are secured by the screws 70 to the top of the cavity in the cap 33. The indents 66 and 69 are locating indents to stop the slides at the desired position with respect to the opening leading from the internal cavity of the cap 33 to the light conducting tube 34.

In the slide 62 is the longitudinal slot 71 adapted to transmit streak illumination in one meridian, a transverse slot 72 adapted to transmit streak illumination in a meridian at right angles to that of 71, a small circular opening 73 and a large circular opening 74.

Beneath the openings 71, 72 and 73 is placed a light diffusing member 75 preferably of ground glass.

In the slide 63 which fits beneath the slide 62 are four circular openings 76, 77, 78 and 79. The opening 77 is fitted with a greenish lens adapted to transmit red free light. The opening 78 is fitted with a blue lens adapted to transmit daylight illumination, and the opening 79 is fitted with a yellow lens, which is useful in determining the chromatic aberration of the eye. It will be understood that various combinations of colors may be used in this slide for definite color requirements.

The lower portion of the inside of the light tube 34 is tapered at 80 to restrict the opening and is provided with the opening 81 for transmitting the light from the cap cavity to the light tube, this opening being located on the axial line of the light tube. The internal walls of the cavity of the cap 33 from the point where it attaches to the support 24 to where it joins the light tube 34 is covered with a light reflective member 92, preferably with a heavy white paint to aid in the illumination.

The support 24 has a slot 82 at its top edge as indicated in Fig. 7. The cap 33 is provided with the slot 83, see Fig. 3, in which fits the retainer bolt 84 which may be slid up and down in the slot 83, it being retained therein by a projection 85 on the bolt 84. It will be noted that the extent of the slot 83 longitudinally in the cap 33 allows the bolt 84 to be moved up higher than the top wall of the slot 82. When the bolt 84 is at the top of the slot 83 the cap 33 may be screwed off of the support 24, but when the bolt 84 is at the bottom of the slot 83 or below the top of the slot 82 then the cap 33 can only be moved to the extent of the slot 82, that is, about ninety degrees, as shown in Fig. 7. This permits of rotation of the lamp 9 through a ninety degree travel back and forth without unlocking the cap 33 from the support 24 and if the bolt 84 is pushed up above the top of the slot 82 the cap 33 can be entirely removed from the support 24.

The design of the shape of the filament in the bulb 9 is of particular importance in this instrument. It will be noted that this filament 86 shown in Fig. 4 has a top or upper portion 87 as shown in the figure lying in a plane perpendicular to the axis of the projection lens 7. This section 87 of the filament forms a perfectly straight line in focus in one plane when projected. The corner between the top portion 87 and the side portion 88 of the filament is preferably a right angle or square bend and is out of the field of projection. This corner may be omitted and the lead wires brought directly to the straight portion 87 of the filament although the described method is better from the electrical characteristics of the lamp. Hitherto the filament of the electric bulb for projecting a streak of light has been of the arched or hairpin shape or a coil spiral at the top. The objection to the arched form is that it cannot be projected into one plane but the images formed will be at different distances from the retinoscope, thus vitiating the requirements of uniform projection. The spiral type projects into a spiral which is a nonuniform projection and, therefore, objectionable.

The operation and characteristic performances of the instrument are as follows: The optical errors in the operator's eye are corrected by the lenses 60 in the disc 59 as has been described, the required lens being rotated into position before the opening 57 in the disc 37. The reflector 56, as has been stated, is a clear transparent reflector positioned in the hood or shield member 55. The advantage of the clear glass reflector is that it reduces the amount of light projected into the patient's eye and increases the percentage of light returned to the operator's eye from the patient's eye. A desired fixation object on the disc 50 is rotated into the opening 52 and the tube 45 is turned or rotated to open the opening 44. This allows illumination from the bulb 9 to come through the tube 43 and illuminate the fixation object. When it is desired to shut off the light it is merely necessary to rotate the tube 45 until the opening 44 is closed.

Figure 13:
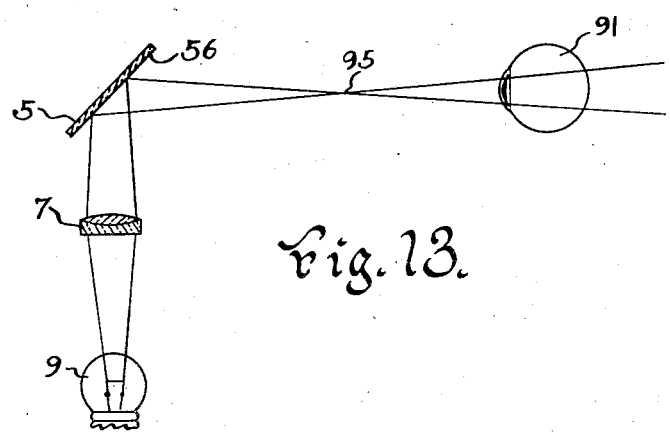
Fig. 13 is a diagrammatic view showing the focusing of a beam of light between the reflector and the patient's eye.
Figure 14:
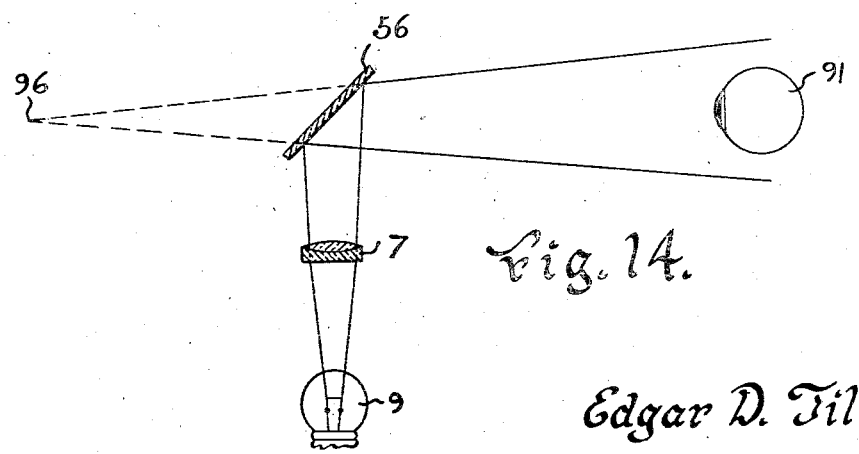
Fig. 14 is a view similar to Fig. 13 but showing the focusing of a beam of light on the side of the reflector away from the patient's eye.

One of the important features of the instrument is the projection lens 7. This is a lens spherically and chromatically corrected so that a sharp image of the source of light may be projected into the desired plane. This lens 7 is adjusted as respects the opening 81 in the light tube 34 by means of the screw 42 operating in the slot 41 in the member 34. By this operation a plain mirror retinoscope or a curved mirror retinoscope may be obtained without introducing the errors due to the curved mirror. When this lens 7 is approaching its greatest distance from the opening 81 the light will converge at 95 in front of the mirror as shown in Fig. 13 without astigmatic aberrations as in previous instruments of this kind giving a true curved mirror effect. When the lens is approaching the lower end of the tube 34 the light will give diverging rays as shown in Fig. 14 forming a virtual image at 96 as required for the plain mirror effect. The rapidity of the reflex in the eye depends upon the amount of convergence or divergence away from the front plane of the eye and by means of the adjustment of this lens this distance can be accurately placed as desired and will be the same through all parts of the beam because of the fact that it is projected with the corrected lens system from a flat source. The internal cavity in the cap 33 is lined with a light reflective substance to aid and assist in increasing the illumination and also increasing the illumination passing through the tube 43. The handle 1 screws into the cap 33 by means of the lock bolt 84 operating in the slot 82, the rotation of the handle in the cap being restricted to the desired amount. When it is desired to remove the handle from the cap it is only necessary to raise the screw 84 above the top of the member 24 when it will be free and allow the parts to be backed out on the screw-thread connection. This is important in turning the filament from one meridian to another meridian at ninety degrees, and is particularly useful when a direct image of the lamp is to be obtained and the image is to be rotated from one meridian to another meridian at ninety degrees. For instance, if it was desired to project in a horizontal plane the image of the section 87 of the filament of the lamp 9 it would be projected as shown in Fig. 4. Then by turning the handle ninety degrees the filament would be shown at a plane ninety degrees from the first one. The use of a streak of light is important in preliminary tests of the eyes, it being usual to throw the light into the eye first in one meridian and then in a meridian at ninety degrees thereto, making the examination for both of these meridians. The direct projection of the filament is principally of value when there are opacities in the eye and the diffused light source is of more value when the eye is free from abnormal light absorption. In some eyes there are opacities or translucent media which absorb light. Again, some eyes have a very small pupil admitting little light. For cases of this kind it is quite essential to have a maximum of illumination and this is obtained by the projection of the filament direct. However, for the average eye with transparent media and an ordinary pupil more accurate refraction is obtained with the diffusing screen in position so that the source of light then is a fine diffusing screen sharply limited in size by clear cut metallic or other boundaries.

The slides 62 and 63 provide for the requisite kind of illumination that I desire to transmit. The slots 71 and 72 are designed for transmitting streak light in two meridians at ninety degrees to each other and this light is diffused by means of the plate 75 on the back thereof. The opening 74 transmits a circular beam of light used in general retinoscopic work.

This light is also diffused by the plate 75. The larger opening 74 transmits no diffused light which is used for throwing a beam directly from the filament after adjusting the position of the projection lens 7 and bulb 9. The openings 76, 77, 78 and 79 in the slide 63 may be used in connection with any of the openings 71, 72, 73 or 74 of the slide 62.

It will be seen that streak illumination may be transmitted in two ways; one, directly by the filament through the section 87 thereof, and the other by means of the openings 71 and 72, the filament being undiffused and the openings being diffused light. The dynamic tests are made as have been described by means of the fixation object on the disc 50.

Referring to Fig. 7, it will be seen that the bar filament 87 has a relation in position to the slot 82. The filament 87 may be adjusted to give the desired relationship to the slot 82 by rotating the ring 11. The bulb 9 is turned on the axis of the handle. To align the filament 87 with the axis of the handle the bulb 9 is displaced from or towards the axis of the handle as desired by oscillating the tube 13 on the resilient ring 12 by means of the screws 32 and springs 31.

From the foregoing description it will be seen that I have provided in one instrument all the necessary combinations for carrying out the various tests used in retinoscopy, eliminating in each the prior art objections, and that I have provided a simple and efficient instrument for general utility for carrying out all the objects of the invention.

Having described my invention, I claim:

1. In an instrument for throwing a beam of light, a source of light, a member having a light conducting chamber leading from the light source, a movable member in the light chamber having two slits arranged at right angles to each other and mounted to slide in a direction transverse to the axis of the light conducting chamber, a lens in the light conducting chamber beyond the movable member, means to change the distance between the lens and movable member to focus the light, a reflector in line with the light conducting chamber to reflect the light, said light issuing through a slit in the movable member, and means for diffusing the light beyond the movable member, the said light source being adjustable relative to the slits.

2. In an instrument for throwing a beam of light, a universally adjustable source of light, a member having a light conducting chamber leading from the light source, a movable member in the light chamber having two slits arranged at right angles to each other and mounted to slide in a direction transverse to the axis of the light conducting chamber, a transparent reflector in line with the light chamber adapted to reflect the image of the light issuing through a slit in the movable member, means for diffusing the light beyond the movable member, and means for changing the color of said light, the said transparent reflector being supported by a light absorbing housing in which it is removably secured.

3. In an instrument for throwing a beam of light, a universally adjustable source of light, a member having a light conducting chamber leading from the light source, a movable member in the light chamber having two slits arranged at right angles to each other and mounted to slide in a direction transverse to the axis of the light conducting chamber, a lens in the light conducting chamber beyond the movable member, means to change the distance between the lens and movable member to focus the light, a transparent reflector in line with the light conducting chamber to reflect the light, said light issuing through a slit in the movable member, means for diffusing the light beyond the movable member, and means for changing the color of said light, the said transparent reflector being supported by a light absorbing housing in which it is removably secured.

4. In an instrument for throwing a beam of light, a handle having an engaging portion thereon, a light source having a straight bar light filament normal to the axis of the handle, a member having a light conducting chamber and an engaging portion rotatably engaging the engaging portion of the handle, stop means adapted to limit the relative rotation between the handle and the member having the light conducting chamber, an axial tube in the handle adapted to support the light source having a straight bar light filament, a flexible member joining the tube and handle at a point relatively remote from the light source whereby the tube may be axially rotated and oscillated in and about the flexible member to turn the straight bar light filament in a plane normal to the axis of the tube to adjust the filament relative to the stop means and to change its position with relation to the axial line of the tube.

5. In an instrument for throwing a beam of light, a light chamber having a source of light, a member having a light passage way extending axially from the chamber, a member having a fixation object supported by the light passage way member beyond the chamber, a tube leading from the light chamber and inclined to the axis thereof and having an opening facing the fixation object, light deflecting means in said tube and a movable member rotatably supported on the tube and having an opening which may be brought into or out of alignment with the opening in the tube to open or close the same to illuminate or shut off illumination from the fixation object.

6. In an instrument for throwing a beam of light, a light chamber having a source of light, a member having a light passage way extending axially from the chamber, a member having a fixation object supported by the light passage way member beyond the chamber, a tube leading from the light chamber and inclined to the axis thereof and having an opening facing the fixation object, a movable member rotatably supported on the tube and having an opening which may be brought into or out of alignment with the opening in the tube to open or close the same to illuminate or shut off illumination from the fixation object, and a reflector aligned with and angularly inclined to the opening in the tube.

7. In an instrument for throwing a beam of light, a handle having a source of light and an engaging portion thereon, a member having a light conducting chamber and an engaging portion rotatably engaging the engaging portion of the handle, means on one of said engaging portions that when moved in one position will limit the rotative movement of the handle to less than a single complete turn and in another position will release the handle for free rotative movement to remove the handle.

8. In an instrument for throwing a beam of light, a handle having a source of light and an engaging portion thereon having a terminal notched guide, a member having a light conducting chamber and an engaging portion rotatably engaging the engaging portion of the handle, and a longitudinally movable stop pin on the member having a light conducting chamber which when moved beyond the end of the engaging portion of the handle allows free relative rotative movement between the handle and light chamber and when moved down into the notched guide portion of the handle limits the said relative rotative movement to less than a full turn.

9. In an instrument for throwing a beam of light, a handle having a source of light, a threaded portion on the handle having a terminal notched guide, a member having a light conducting chamber and a threaded portion rotatably engaging the threaded portion of the handle, a longitudinal slot in said member, a stop pin movable in the longitudinal slot into and out of engagement with the terminal notched guide to allow free relative rotative movement between the handle and the light chamber when moved out of engagement with the terminal notched guide and to limit the said relative rotative movement to less than a full turn when moved into engagement with the terminal notched guide.

10. In an instrument for throwing a beam of light, a member having a light chamber, a source of light in the light chamber, a member having a light passage way extending from the chamber, a fixation object supported beyond the light chamber, a tube leading from the light chamber and having an opening facing the fixation object, light deflecting means in said tube, and a movable member rotatable on the tube and having an opening which may be brought into or out of alignment with the opening in the tube to open or close the same to illuminate or shut off the illumination from the fixation object.

11. In an instrument for throwing a beam of light, a member having a light chamber, a source of light in the light chamber, a member having a light passage way extending from the light chamber, a fixation object supported beyond the light chamber, a tube leading from the light chamber and having an opening facing the fixation object, a movable member rotatable on the tube and having an opening which may be brought into or out of alignment with the opening in the tube to open or close the same to illuminate or shut off illumination from the fixation object and a reflector aligned with and angularly inclined to the opening in the tube.

EDGAR D. TILLYER.